United States Patent
Zeng et al.

(10) Patent No.: US 9,641,373 B2
(45) Date of Patent: May 2, 2017

(54) PEAK-TO-AVERAGE POWER RATIO (PAPR) REDUCTION IN FRONTHAULS

(71) Applicant: Futurewei Technologies, Inc., Plano, TX (US)

(72) Inventors: Huaiyu Zeng, Red Bank, NJ (US); Xiang Liu, Marlboro, NJ (US); Frank Effenberger, Colts Neck, NJ (US); Guozhu Long, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/182,362

(22) Filed: Jun. 14, 2016

(65) Prior Publication Data

US 2016/0373283 A1 Dec. 22, 2016

Related U.S. Application Data

(60) Provisional application No. 62/182,053, filed on Jun. 19, 2015.

(51) Int. Cl.
*H04B 7/00* (2006.01)
*H04L 27/26* (2006.01)
*H04W 52/36* (2009.01)

(52) U.S. Cl.
CPC ......... *H04L 27/2623* (2013.01); *H04W 52/36* (2013.01)

(58) Field of Classification Search
USPC .............. 455/522, 69–70, 561; 370/310–320
See application file for complete search history.

(56) References Cited

U.S. PATENT DOCUMENTS

| 6,512,797 B1* | 1/2003 | Tellado | H04L 27/2602 370/319 |
| 7,013,161 B2* | 3/2006 | Morris | H03G 7/002 375/261 |

(Continued)

FOREIGN PATENT DOCUMENTS

| CN | 101741415 A | 6/2010 |
| CN | 104066018 A | 9/2014 |

OTHER PUBLICATIONS

Zeng, Huaiyu, et al., Patent Application entitled, "Digital Representations of Analog Signals and Control Words Using Different Multi-Level Modulation Formats," filed Sep. 14, 2015, as U.S. Appl. No. 14/853,478.

(Continued)

*Primary Examiner* — Fayyaz Alam
(74) *Attorney, Agent, or Firm* — Conley Rose, P.C.

(57) ABSTRACT

An apparatus comprises: a receiver port configured to receive an input signal comprising in-phase and quadrature (IQ) data and control words (CWs); a peak-to-average power (PAPR) reducer coupled to the receiver port and configured to: receive the IQ data, process the IQ data, separate the IQ data into a clipped signal and a peak signal, and determine peak information associated with the peak signal; and a transmitter port coupled to the PAPR reducer and configured to separately transmit the clipped signal and the peak information. A method comprises: receiving an input signal comprising first data and second data; processing the first data; separating the first data into a clipped signal and a peak signal; determining peak information associated with the peak signal; and transmitting the clipped signal and the peak information.

20 Claims, 7 Drawing Sheets

(56) References Cited

U.S. PATENT DOCUMENTS

| | | | |
|---|---|---|---|
| 7,986,738 B2* | 7/2011 | Sankabathula | H04L 27/2618 |
| | | | 375/147 |
| 8,885,736 B2* | 11/2014 | Garg | H04M 11/062 |
| | | | 375/260 |
| 2002/0042253 A1* | 4/2002 | Dartois | H03F 1/3247 |
| | | | 455/127.1 |
| 2007/0026820 A1 | 2/2007 | Sarraf | |
| 2008/0233901 A1* | 9/2008 | Ebiko | H04L 27/2624 |
| | | | 455/114.2 |
| 2015/0365934 A1 | 12/2015 | Liu et al. | |
| 2016/0150438 A1* | 5/2016 | Rawlins | H04W 28/0221 |
| | | | 370/311 |

OTHER PUBLICATIONS

Zeng, Huaiyu, et al., Patent Application entitled, "Windowing Methods for Efficient Channel Aggregation and Reaggregation," filed Mar. 1, 2016, as U.S. Appl. No. 15/057,645.
Liu, Xiang, et al., Patent Application entitled, "Cascaded Waveform Modulation with an Embedded Control Signal for High-Performance Mobile Fronthaul," filed Jun. 10, 2016, as U.S. Appl. No. 15/179,526.
Foreign Communication From a Counterpart Application, PCT Application No. PCT/CN2016/085997, International Search Report dated Sep. 20, 2016, 7 pages.
Foreign Communication From a Counterpart Application, PCT Application No. PCT/CN2016/085997, Written Opinion dated Sep. 20, 2016, 4 pages.

* cited by examiner

PEAK-TO-AVERAGE POWER RATIO (PAPR) REDUCTION IN FRONTHAULS

CROSS-REFERENCE TO RELATED APPLICATIONS

This application claims priority to U.S. provisional patent application No. 62/182,053 filed Jun. 19, 2015 by Huaiyu Zeng, et al., and titled "Peak-to-Average Power Ratio (PAPR) Reduction for Efficient Mobile Fronthaul (EMF)," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A radio access network (RAN) is a network between mobile devices and a core network. In the RAN, digital baseband (BB) processing is typically performed at wireless base stations located at remote cell sites. However, in a cloud RAN (C-RAN), digital baseband (BB) processing is relocated to centralized baseband units (BBUs) located at a central site near a core network and remote radio units (RRUs) replace the wireless base stations. The RRUs interface with antennas for wireless radio frequency (RF) transmission and reception. The RRUs require limited digital BB processing.

In the C-RAN, a fronthaul connects the BBUs to the RRUs. The fronthaul digitizes wireless channels, aggregates the digitized channels, and transports the aggregated channels using an aggregated fiber optical channel or aggregated microwave channel. Because the aggregated channel has a high data rate, it requires complex communications systems. An efficient mobile fronthaul (EMF), or aggregated touch-less fronthaul, provides a digital signal processing (DSP)-based channel aggregation and de-aggregation scheme with low latency, high bandwidth efficiency, and high throughput.

SUMMARY

Current EMFs may suffer from substantial noise, a high PAPR, and a high error vector magnitude (EVM). According to various embodiments of the present disclosure, PAPR reduction is provided. Transmitters in the fronthauls, which are located in BBUs, RRUs, or other suitable components, separate frequency-divisional multiplexing (FDM) or time-division multiplexing (TDM) input signals into peak signals and non-peak signals, the latter of which may also be referred to as clipped signals. Because peak signals have larger magnitudes than clipped signals, errors in the peak signals similarly have larger magnitudes than errors in the clipped signals. Thus, errors in the peak signals have a greater effect on a signal-to-noise ratio (SNR) than errors in the clipped signals. For that reason, the transmitters transmit the peak signals on a high-quality, substantially error-free control word (CW) channel. In contrast, the transmitters transmit the clipped signals on an in-phase and quadrature (IQ) channel that is not substantially error-free. Furthermore, peaks are less prevalent than non-peaks, so the transmitters reduce the amount of transmitted data by transmitting time indices of the peaks. Receivers in the fronthauls therefore assume that all data are non-peaks unless time indices indicate otherwise. In this way, the fronthauls reduce a PAPR, which also reduces an EVM.

In one embodiment, the disclosure includes an apparatus comprising: a receiver port configured to receive an input signal comprising in-phase and quadrature (IQ) data and control words (CWs); a peak-to-average power (PAPR) reducer coupled to the receiver port and configured to: receive the IQ data, process the IQ data, separate the IQ data into a clipped signal and a peak signal, and determine peak information associated with the peak signal; and a transmitter port coupled to the PAPR reducer and configured to separately transmit the clipped signal and the peak information. In some embodiments, the transmitter port is further configured to not transmit the peak signal; the transmitter port is further configured to: transmit the clipped signal using an IQ channel; and transmit the peak information using a CW channel; the IQ channel is not substantially error-free and the CW channel is substantially error-free; the PAPR reducer is further configured to further process the input signal according to the following algorithm: if $s(n)>V_{max}$, $k(n)=\text{ceiling}[(s(n)-V_{max})/\Delta]$, $p(n)=k(n)*\Delta$, $c(n)=s(n)-p(n)$; else if $s(n)<-V_{max}$, $k(n)=\text{floor}[(s(n)+V_{max})/\Delta]$, $p(n)=k(n)*\Delta$, $c(n)=s(n)-p(n)$; else, $p(n)=0$, $c(n)=s(n)$, wherein $s(n)$ is the input signal, n is a time index or a frequency index, $V_{max}$ is a clipping threshold, $k(n)$ is a quantization level, $\Delta$ is a quantization step, $p(n)$ is the peak signal, and $c(n)$ is the clipped signal, and wherein the transmitter port is further configured to transmit n and $k(n)$ using a CW channel; the PAPR reducer is further configured to further process the input signal according to the following algorithm: if $s(n)>V_{max}$, $p(n)=S_{max}-V_{max}$, $c(n)=s(n)-p(n)$; else if $s(n)<-V_{max}$, $p(n)=S_{max}-V_{max}$, $c(n)=s(n)+p(n)$; else, $p(n)=0$, $c(n)=s(n)$, wherein $s(n)$ is the input signal, n is a time index or a frequency index, $V_{max}$ is a clipping threshold, $p(n)$ is the peak signal, $S_{max}$ is a maximum amplitude of the input signal, and $c(n)$ is the clipped signal, and wherein the transmitter port is further configured to transmit n using a CW channel; the PAPR reducer is further configured to further process the input signal according to the following algorithm: if $|s(n)|>V_{max}$, $\alpha=V_{max}/S_{max}$, $c(n)=\alpha*s(n)$; else $c(n)=s(n)$, wherein $s(n)$ is the input signal, n is a time index or a frequency index, $\alpha$ is a constant, $V_{max}$ is a clipping threshold, $S_{max}$ is a maximum amplitude of the input signal, and $c(n)$ is the clipped signal, and wherein the transmitter port is further configured to transmit n using a CW channel; the PAPR reducer is further configured to further process the input signal according to the following algorithm: if $s(n)>V_{max}$, $c(n)=2*V_{max}-s(n)$; else if $s(n)<-V_{max}$, $c(n)=-2*V_{max}-s(n)$; else $c(n)=s(n)$, wherein $s(n)$ is the input signal, n is a time index or a frequency index, $V_{max}$ is a clipping threshold, and $c(n)$ is the clipped signal, and wherein the transmitter port is further configured to transmit n using a CW channel; the PAPR reducer is further configured to separate the IQ data into the clipped signal and the peak signal based on a clipping threshold that is 0.5 times to 0.8 times a maximum amplitude of the IQ data.

In another embodiment, the disclosure includes a method comprising: receiving an input signal comprising first data and second data; processing the first data; separating the first data into a clipped signal and a peak signal; determining peak information associated with the peak signal; and transmitting the clipped signal and the peak information. In some embodiments, the first data are in-phase and quadrature (IQ) data and the second data are control words (CWs); the method further comprises further transmitting the clipped signal using an IQ channel and the peak information using a CW channel; the IQ channel is not substantially error-free and the CW channel is substantially error-free; the peak information comprises an index for each non-zero value of the peak signal, wherein the index represents time; the peak information further comprises a quantization level for each non-zero value of the peak signal; the method further comprises separating the first data into the clipped signal and the peak signal based on a clipping threshold that is 0.5 times to 0.8 times a maximum amplitude of the first data.

In yet another embodiment, the disclosure includes an apparatus comprising: a receiver port configured to: receive a clipped signal using a first channel that is not substantially error-free, and receive peak information using a second channel that is substantially error-free, wherein the peak information is associated with a peak signal; and a peak recoverer coupled to the receiver port and configured to recover the peak signal based on the clipped signal and the peak information. In some embodiments, the peak recoverer is further configured to combine the clipped signal and the peak signal to form an input signal; the peak information consists of an index for each non-zero value of the peak signal; the peak information consists of an index and a quantization level for each non-zero value of the peak signal.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
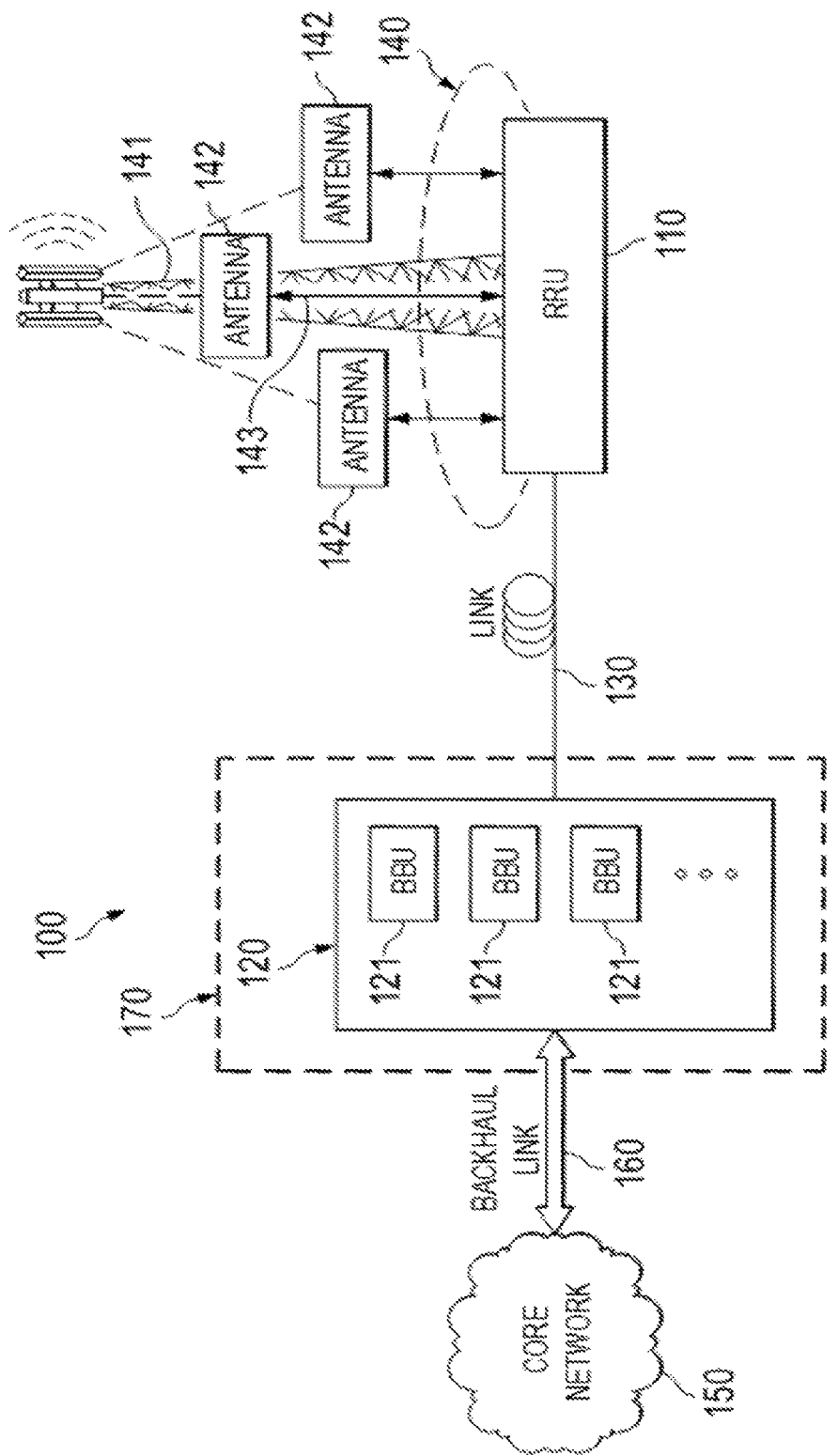
FIG. 1 is a schematic diagram of a C-RAN.

FIG. 1 is a schematic diagram of a C-RAN 100. The C-RAN 100 generally comprises a core network 150 communicatively coupled to a central office (CO) 170 via a backhaul link 160 and an RRU 110 communicatively coupled to the CO 170 via a link 130. The components of the C-RAN 100 may be arranged as shown or in any other suitable manner.

The core network 150 comprises interconnected sub-networks operated by service providers. The core network 150 is a central part of a larger network that provides network services to mobile devices in the sub-networks. The backhaul link 160 is a cable link, a free-space optics (FSO) link, or an optical fiber link that communicates packets such as Ethernet packets between the core network 150 and a BBU pool 120.

The CO 170 is a building, a part of a building, or other structure or facility that houses the BBU pool 120. The BBU pool 120 couples the RRU 110 to the core network 150 via the backhaul link 160. The BBU pool 120 comprises BBUs 121. The BBUs 121 perform BB DSP and wireless media access control (MAC) processing according to a wireless communication protocol. The link 130 is a cable link, an FSO link, or an optical fiber link that communicates digital BB signals between the BBU pool 120 and the RRU 110.

The RRU 110 is commonly located in a cell 140 at the bottom of a cell tower 141 that comprises antennas 142. The cell 140 is a geographical area located at a remote location away from the CO 170 and may comprise one or more cell sectors, which mobile operators may determine during network deployment. The RRU 110 communicates with mobile devices located in the cell 140 and does so via the antennas 142 and using designated wireless downlink (DL) radio frequency (RF) channels and wireless uplink (UL) RF channels. DL refers to a communication direction from the CO 170 towards the mobile devices, and UL refers to a communication direction from the mobile devices towards the CO 170. The wireless DL RF channels and the wireless UL RF channels may be Long-Term Evolution (LTE), LTE Advanced (LTE-A), or other evolved Universal Mobile Telecommunications System Terrestrial Radio Access (e-UTRA) channels.

In a DL direction, the core network 150 forwards DL data packets to the BBU pool 120 via the backhaul link 160. The BBUs 121 generate DL signals from corresponding DL data packets by performing BB processing and MAC processing. The BBUs 121 aggregate the DL signals into aggregated DL signals and transmit the aggregated DL signals to the RRU 110 via the link 130. The RRU 110 deaggregates the aggregated DL signals and transmits the deaggregated DL signals to the mobile devices in corresponding DL RF channels.

In a UL direction, the RRU 110 receives UL RF signals from the mobile devices, aggregates the UL RF signals into aggregated UL signals, and transmits the aggregated UL signals to the BBU pool 120 via the link 130. The BBUs 121 deaggregate the aggregated UL signals and perform BB processing and MAC processing on the deaggregated UL signals to recover the original UL RF signals from the mobile devices. The BBUs 121 convert the UL RF signals into packets and transmit the packets to the core network 150 via the backhaul link 160. The BBUs 121 may coordinate with each other to jointly process the aggregated UL signals.

The BBU pool 120, the link 130, and the RRU 110 make up a fronthaul or an EMF. EMFs are described in U.S. patent application Ser. No. 14/528,823 filed on Oct. 30, 2014 by Xiang Liu, et al, and titled "Aggregated Touchless Wireless Fronthaul," which is incorporated by reference. The fronthaul communicates digital representations of analog wireless signals, typically in the form of digitized in-phase (I) components and quadrature (Q) components of BB signals, which are referred to as IQ data. The fronthaul further communicates CWs, which the BBUs 121 and the RRU 110 use for equipment control and management. The fronthaul communicates the IQ data on an IQ channel and communicates the CWs on a CW channel. The IQ data do not require substantially error-free communication, so the IQ channel is not a substantially error-free channel and may experience substantial noise. In contrast, the CWs may require substantially error-free communication, so the CW channel is a high-quality, substantially error-free channel. For instance, the CW channel may have a bit error rate (BER) of about $10^{-12}$.

The link 130 may allow the introduction of distortion into transmitted signals, such as intersymbol interference (ISI), crosstalk, and noise. The transmitters and the receivers in the BBUs 121 and the RRU 110 may address intersymbol interference (ISI) and crosstalk via FDM and a receiver equalizer. The noise in the link 130, as well as front-end components such as analog-to-digital converters (ADCs), digital-to-analog converters (DACs), and amplifiers, increases an EVM. It is desirable to increase a signal-to-noise ratio (SNR) in order to decrease the EVM. In addition, the IQ data may be in the form of orthogonal frequency-divisional multiplexing (OFDM) signals, which typically have high peak-to-average power ratios (PAPRs). It is therefore desirable to reduce a PAPR of the IQ data in order to increase the SNR, which decreases the EVM.

Disclosed herein are embodiments for PAPR reduction in fronthauls or EMFs. Transmitters in the fronthauls, which are located in BBUs, RRUs, or other suitable components, separate FDM or TDM input signals into peak signals and non-peak signals, the latter of which may also be referred to as clipped signals. Because peak signals have larger magnitudes than clipped signals, errors in the peak signals similarly have larger magnitudes than errors in the clipped signals. Thus, errors in the peak signals have a greater effect on a signal-to-noise ratio (SNR) than errors in the clipped signals. For that reason, the transmitters transmit peak information associated with the peak signals on a high-quality, substantially error-free CW channel. In contrast, the transmitters transmit the clipped signals on an IQ channel that is not substantially error-free. Furthermore, peaks are less prevalent than non-peaks, so the transmitters reduce the amount of transmitted data by transmitting time indices of the peaks. Receivers in the fronthauls therefore assume that all data are non-peaks unless time indices indicate otherwise. In this way, the fronthauls reduce a PAPR, which also reduces an EVM.

Figure 2:
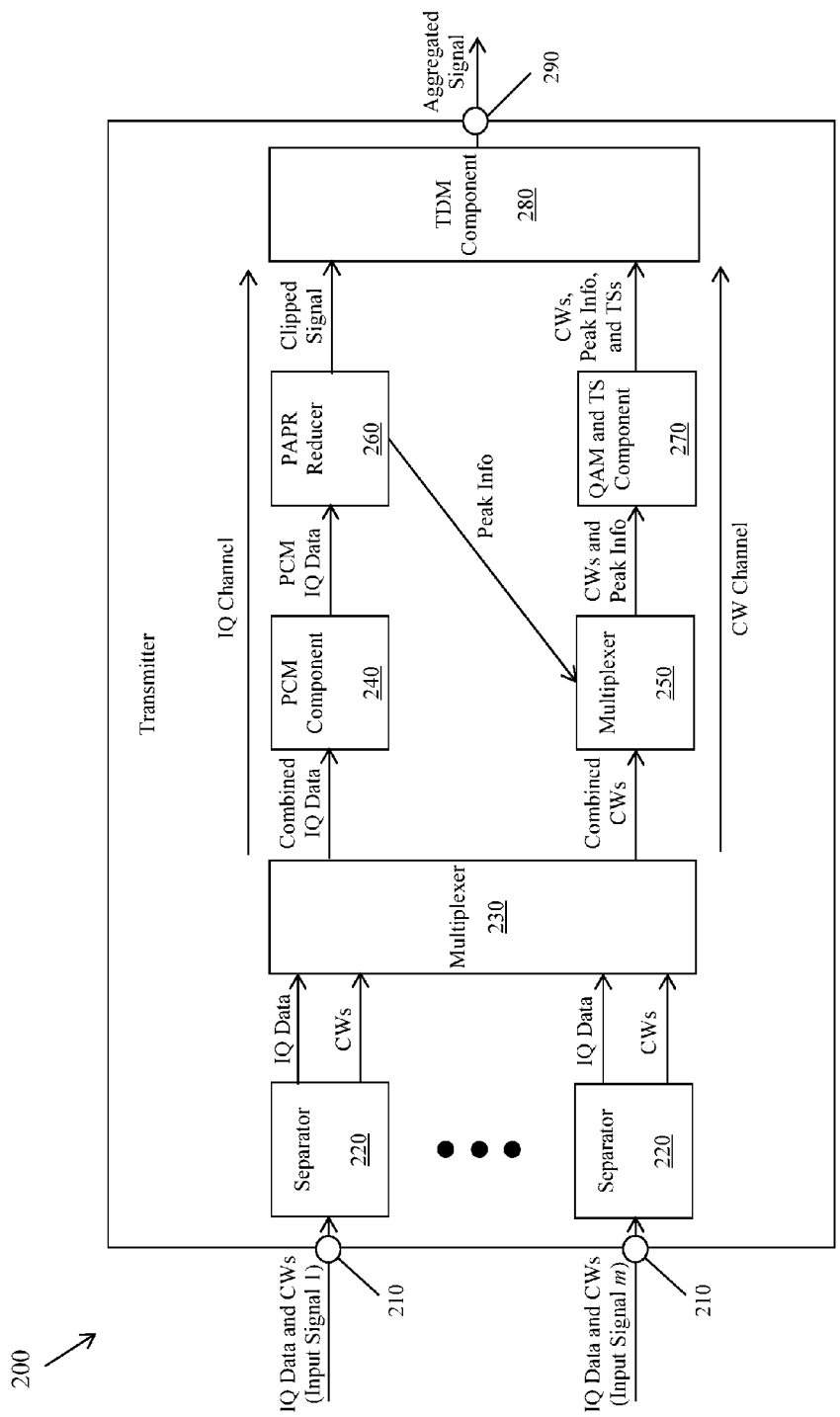
FIG. 2 is a schematic diagram of a transmitter according to an embodiment of the disclosure.

FIG. 2 is a schematic diagram of a transmitter 200 according to an embodiment of the disclosure. The BBUs 121 and/or the RRU 110 may employ the transmitter 200. The transmitter 200 comprises m number of receiver ports 210, m separators 220, a multiplexer 230, a pulse-code modulation (PCM) component 240, a multiplexer 250, a PAPR reducer 260, a quadrature-amplitude modulation (QAM), training symbol (TS) component 270, a TDM component 280, and a transmitter port 290. The number m is a positive integer.

A path from the multiplexer 230, through the PCM component 240, the PAPR reducer 260, and the TDM component 280, and to the transmitter port 290 makes up an IQ channel. A path from the multiplexer 230, through the multiplexer 250, the QAM and TS component 270, and the TDM component 280, and to the transmitter port 290 makes up a CW channel. The IQ channel and the CW channel further extend beyond the transmitter port 290 into a medium such as the link 130. The IQ channel is similar to a traffic channel that is not substantially error free, and the CW channel is similar to a control channel that is substantially error free. The IQ channel and the CW channel may be distinguished by any suitable means such as time, frequency, or space.

The receiver ports 210 receive m input signals comprising IQ data and CWs from, for instance, DACs in the BBUs 121, a DAC in the RRU 110, or from other devices, systems, or networks and pass the input signals to the separators 220. The separators 220 separate the IQ data and the CWs, provide the IQ data in m number of signals to the multiplexer 230, and provide the CWs in m signals to the multiplexer 230. The multiplexer 230 multiplexes the m IQ data signals into a combined IQ data signal, multiplexes the m CW data signals into a combined CWs signal, provides the combined IQ data signal to the PCM component 240, and provides the combined CWs signal to the multiplexer 250. The PCM component 240 encodes the combined IQ data signal using a PCM scheme to create PCM IQ data and provides the PCM IQ data to the PAPR reducer 260.

The PAPR reducer 260 performs a PAPR-reduction algorithm or algorithms of the PCM IQ data, as described below, to produce a clipped signal and peak information (info). The PAPR reducer 260 passes the clipped signal to the TDM component 280, while also providing the peak information, but not the peak signal, to the multiplexer 250. Thus, the clipped signal passes through the IQ channel and the peak information passes through the CW channel.

The multiplexer 250 multiplexes the peak information with the combined CW signal and provides the combined CW signal and peak information to the QAM and TS component 270. The QAM and TS component 270 encodes the combined CW signal and peak information using a QAM scheme such as 16-level QAM (16-QAM) and inserts TSs to create QAM CWs, peak information, and TSs, then provides the QAM CWs, peak information, and TSs to the TDM component 280. The TDM component 280 time-multiplexes the clipped signal with the CWs, peak information, and TSs into a time-multiplexed aggregated signal and passes the aggregated signal to the transmitter port 290. Finally, the transmitter port 290 transmits the aggregated signal to another component or device. The aggregated signal is time multiplexed so that the transmitter port 290 separately transmits the clipped signal on the one hand and the CWs, peak information, and TSs on the other hand. Specifically, the transmitter port 290 transmits the clipped signal using the IQ channel and the CWs, peak information, and TSs using the CW channel.

Figure 3:
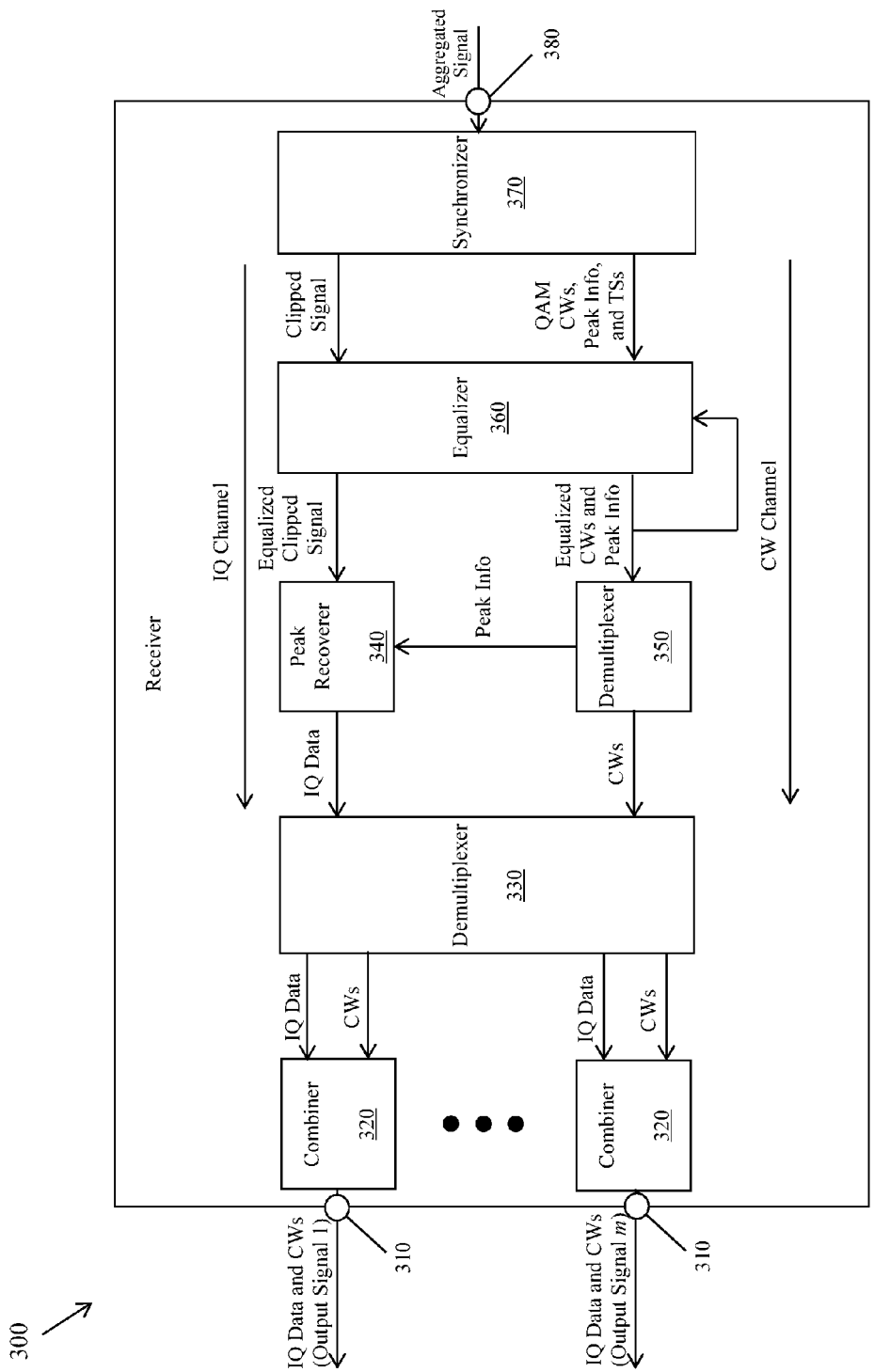
FIG. 3 is a schematic diagram of a receiver according to an embodiment of the disclosure.

FIG. 3 is a schematic diagram of a receiver 300 according to an embodiment of the disclosure. The BBUs 121 and/or the RRU 110 may employ the receiver 300. The receiver 300 comprises m number of transmitter ports 310, m combiners 320, a demultiplexer 330, a peak recoverer 340, a demultiplexer 350, an equalizer 360, a synchronizer 370, and a receiver port 380.

A path from the receiver port 380, through the synchronizer 370, the equalizer 360, and the peak recoverer 340, and to the demultiplexer 330 makes up an IQ channel. A path from the receiver port 380, through the synchronizer 370, the equalizer 360, and the demultiplexer 350, and to the demultiplexer 330 makes up a CW channel. The IQ channel and the CW channel further extend beyond the receiver port 380 into a medium such as the link 130. The IQ channel is similar to a traffic channel that is not substantially error free, and the CW channel is similar to a control channel that is substantially error free. The IQ channel and the CW channel may be distinguished by any suitable means such as time, frequency, or space.

The receiver port 380 receives an aggregated signal from, for instance, the transmitter 200 or another device, system, or network and passes the aggregated signal to the synchronizer 370. The synchronizer 370 detects the beginnings of frames in the aggregated signal and synchronizes those frames using TSs in the aggregated signal and using time-domain demultiplexing. The synchronizer 370 then provides a clipped signal to the equalizer 360 via the IQ channel and CWs, peak information, and TSs to the equalizer 360 via the CW channel. Thus, the clipped signal passes through the IQ channel and the peak information passes through the CW channel.

The equalizer 360 performs equalization on the clipped signal and performs equalization on the CWs, peak information, and TSs to suppress or remove ISI. The equalizer 360 trains and updates coefficients using CWs in a feedback loop from an output of the equalizer 360. The equalizer 360 then provides an equalized clipped signal to the peak recoverer 340 and equalized CWs and peak information to the demultiplexer 350.

The demultiplexer 350 demultiplexes the CWs and the peak information using a time slot schedule from prior messaging such as messaging with the transmitter 200, pre-configuration, or another suitable means. The demultiplexer 350 provides the peak information to the peak recoverer 340 and provides the CWs to the demultiplexer 330. The peak recoverer 340 receives the peak information from the demultiplexer 350 and performs a PAPR-reduction algorithm or algorithms, as described below, to recover the original IQ data using the clipped signal and the peak information. The peak recoverer 340 provides the recovered original IQ data to the demultiplexer 330. The demultiplexer 330 demultiplexes the IQ data into m number of IQ data signals, demultiplexes the CWs into m CW signals, and provides the IQ data signals and the CW signals to their respective combiners 320. The combiners 320 combine their respective IQ data signals and CW signals to form output signals comprising IQ data and CWs and pass the outputs signals to the transmitter ports 310. Finally, the transmitter ports 310 transmit the output signals to other components or devices, for example, ADCs in the BBUs 121 or a DAC in the RRU 110.

In a first embodiment, in the transmitter 200, the PAPR reducer 260 processes the following PAPR-reduction algorithm:

if $s(n) > V_{max}$, $k(n) = \text{ceiling}[(s(n) - V_{max})/\Delta]$ $p(n) = k(n) * \Delta$ $c(n) = s(n) - p(n);$ else if $s(n) < -V_{max}$, $k(n) = \text{floor}[(s(n) + V\text{max})/\Delta]$ $p(n) = k(n) * \Delta$ $c(n) = s(n) - p(n);$ else, $p(n) = 0$ $c(n) = s(n).$ The S(n) is an input signal, specifically the IQ data that the PAPR reducer 260 receives. The n is an index that represents a time index or a frequency index in a frame, where n is an integer between 0 and N−1, and where N is a frame size. The $V_{max}$ is a clipping threshold. The k(n) is a quantization level. The ceiling is a ceiling function that maps a real number to the least integer greater than or equal to the real number. The Δ is a peak quantization step. The p(n) is a peak signal. The c(n) is a clipped signal. The floor is a floor function that maps a real number to the greatest integer less than or equal to the real number. The clipping threshold $V_{max}$ may be 0.5 times to 0.8 times $S_{max}$, which is a maximum amplitude of the input signal. The PAPR reducer 260 provides c(n) to the TDM component 280 through the IQ channel and the peak information to the multiplexer 250 through the CW channel. The peak information comprises the index n and the quantization level k(n) for each non-zero value of the peak signal p(n). Thus, the peak information does not comprise the index n and the quantization level k(n) for each zero value of the peak signal p(n).

In the receiver 300, the peak recoverer 340 processes the following PAPR-reduction algorithm:

if $n$ is not received, $s(n) = c(n);$ else $p(n) = k(n) * \Delta,$ $s(n) = p(n) + c(n).$ For all values of the index n that the receiver 300 does not receive, in other words for all values of the index n not corresponding to a peak, the peak recoverer 340 determines that the input signal s(n) is equal to the clipped signal c(n). Otherwise, the peak recoverer 340 multiplies the quantization level k(n) for each value of received index n by the peak quantization step Δ to form the peak signal p(n), and the peak recoverer 340 adds the clipped signal c(n) and the peak signal p(n) to form the input signal s(n). The peak recoverer 340 knows the peak quantization step Δ from prior messaging, such as with the transmitter 200, pre-configuration, or another suitable means.

In a second embodiment, in the transmitter 200, the PAPR reducer 260 processes the following PAPR-reduction algorithm:

if $s(n) > V_{max}$, $p(n) = S_{max} - V_{max}$ $c(n) = s(n) - p(n);$ else if $s(n) < -V_{max}$, $p(n) = S_{max} - V_{max}$ $c(n) = s(n) + p(n);$ else, $p(n) = 0$ $c(n) = s(n).$ The PAPR reducer 260 provides c(n) to the TDM component 280 through the IQ channel and the peak information to the multiplexer 250 through the CW channel. Because the amplitude of non-zero p(n) values is fixed at the maximum amplitude $S_{max}$ for each non-zero value of the peak signal p(n), the peak information need comprise only the index n.

In the receiver 300, the peak recoverer 340 processes the following PAPR-reduction algorithm:

if $n$ is not received, $s(n) = c(n);$ else if $c(n)>0$, $s(n)=c(n)+(S_{max}-V_{max})$;

else if $c(n)\leq 0$, $s(n)=c(n)-(S_{max}-V_{max})$.

For all values of the index n that the receiver 300 does not receive, in other words for all values of the index n not corresponding to a peak, the peak recoverer 340 determines that the input signal s(n) is equal to the clipped signal c(n). Otherwise, if the clipped signal c(n) is greater than zero, then the input signal s(n) is equal to the sum of the clipped signal c(n) and the quantity ($S_{max}-V_{max}$). Otherwise, if the clipped signal c(n) is less than or equal to zero, then the input signal s(n) is equal to the clipped signal c(n) minus the quantity ($S_{max}-V_{max}$). The peak recoverer 340 knows the maximum amplitude $S_{max}$ and the clipping threshold $V_{max}$ from prior messaging with the transmitter 200, pre-configuration, or another suitable means.

In a third embodiment, in the transmitter 200, the PAPR reducer 260 processes the following PAPR-reduction algorithm:

if $|s(n)|>V_{max}$, $\alpha=V_{max}/S_{max}$, $c(n)=\alpha*s(n)$;

else $c(n)=s(n)$.

$\alpha$ is a constant. The PAPR reducer 260 provides c(n) to the TDM component 280 through the IQ channel and the peak information to the multiplexer 250 through the CW channel. Because the amplitude of non-zero p(n) values is fixed at the maximum amplitude $S_{max}$ for each non-zero value of the peak signal p(n), the peak information need comprise only the index n.

In the receiver 300, the peak recoverer 340 processes the following PAPR-reduction algorithm:

if n is not received, $s(n)=c(n)$;

else $s(n)=c(n)/\alpha$.

For all values of the index n that the receiver 300 does not receive, in other words for all values of the index n not corresponding to a peak, the peak recoverer 340 determines that the input signal s(n) is equal to the clipped signal c(n). Otherwise, the input signal is equal to the clipped signal divided by the constant $\alpha$. The peak recoverer 340 knows the maximum amplitude $S_{max}$ and the clipping threshold $V_{max}$ from prior messaging with the transmitter 200, pre-configuration, or another suitable means. Thus, the peak recoverer 340 knows the constant $\alpha$, which is the clipping threshold $V_{max}$ divided by the maximum amplitude $S_{max}$.

In a fourth embodiment, in the transmitter 200, the PAPR reducer 260 processes the following PAPR-reduction algorithm:

if $s(n)>V_{max}$, $c(n)=2*V_{max}-s(n)$;

else if $s(n)<-V_{max}$, $c(n)=-2*V_{max}-s(n)$;

else $c(n)=s(n)$.

The PAPR reducer 260 provides c(n) to the TDM component 280 through the IQ channel and the peak information to the multiplexer 250 through the CW channel. Because the amplitude of non-zero p(n) values is fixed at the maximum amplitude $S_{max}$ for each non-zero value of the peak signal p(n), the peak information need comprise only the index n.

In the receiver 300, the peak recoverer 340 processes the following PAPR-reduction algorithm:

if n is not received, $s(n)=c(n)$;

else if $c(n)>0$, $s(n)=2*V_{max}-c(n)$;

else if $c(n)\leq 0$, $s(n)=-2*V_{max}-c(n)$.

For all values of the index n that the receiver 300 does not receive, in other words for all values of the index n not corresponding to a peak, the peak recoverer 340 determines that the input signal s(n) is equal to the clipped signal c(n). Otherwise, if the clipped signal is greater than zero, then the input signal is equal to the quantity $2*V_{max}$ minus the clipped signal c(n). Otherwise, if the clipped signal is less than or equal to zero, then the input signal is equal to the quantity $-2*V_{max}$, minus the clipped signal c(n). The peak recoverer 340 knows the clipping threshold $V_{max}$ from prior messaging with the transmitter 200, pre-configuration, or another suitable means.

The peak signal p(n) occurs at a very low rate, so it is more efficient to communicate the index n only for each non-zero value of the peak signal p(n), but that approach increases latency. For example, if the peak occurs at a rate of $10^{-3}$ peaks per sample, then 1,000 samples may need to be buffered to obtain 1 peak. However, compared to a single IQ data signal, a combined IQ data signal comprising multiple IQ data signals aggregated with each other has a peak signal p(n) at a relatively higher rate. This allows for use of a low-latency buffer for each IQ data signal, which provides for both a low latency and a low data rate. Continuing with the same example, if the combined IQ data signal comprises 10 IQ data signals, then only 100 samples may need to be buffered for each IQ data signal.

Figure 4:
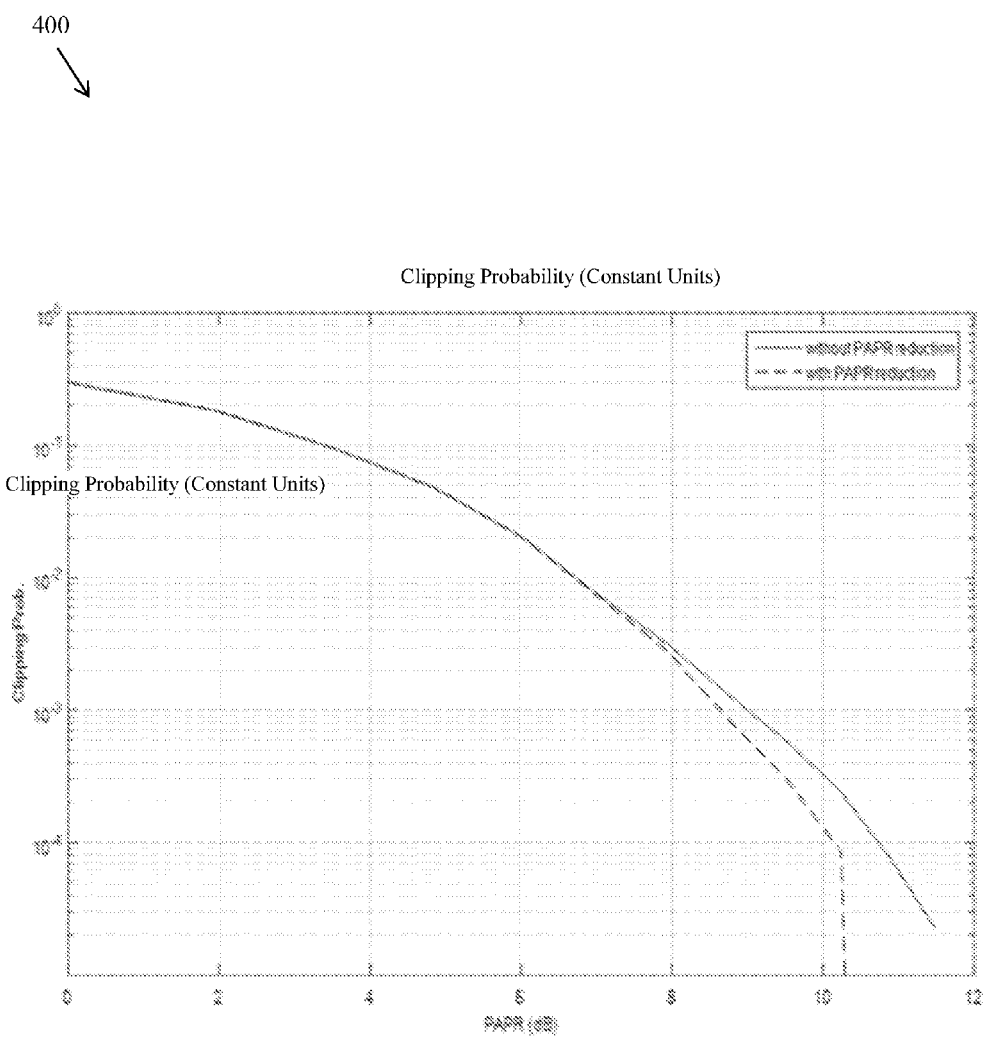
FIG. 4 is a graph of simulated clipping probability versus PAPR measured at the receiver in FIG. 3.

FIG. 4 is a graph 400 of simulated clipping probability versus PAPR measured at the receiver 300 in FIG. 3. The x-axis represents PAPR in decibels (dB), and the y-axis represents clipping probability in constant units. Clipping probability is also referred to as the complementary cumulative distribution function (CCDF). The graph 400 comprises two curves, a first solid curve representing clipping probability without PAPR reduction and a second dashed curve representing clipping probability with PAPR reduction. As shown, an EMF without PAPR reduction is usually clipped at a clipping probability of $2e^{-5}$ to $3e^{-5}$. At that point, the EMF provides about 2.5 dB reduction in PAPR.

Figure 5:
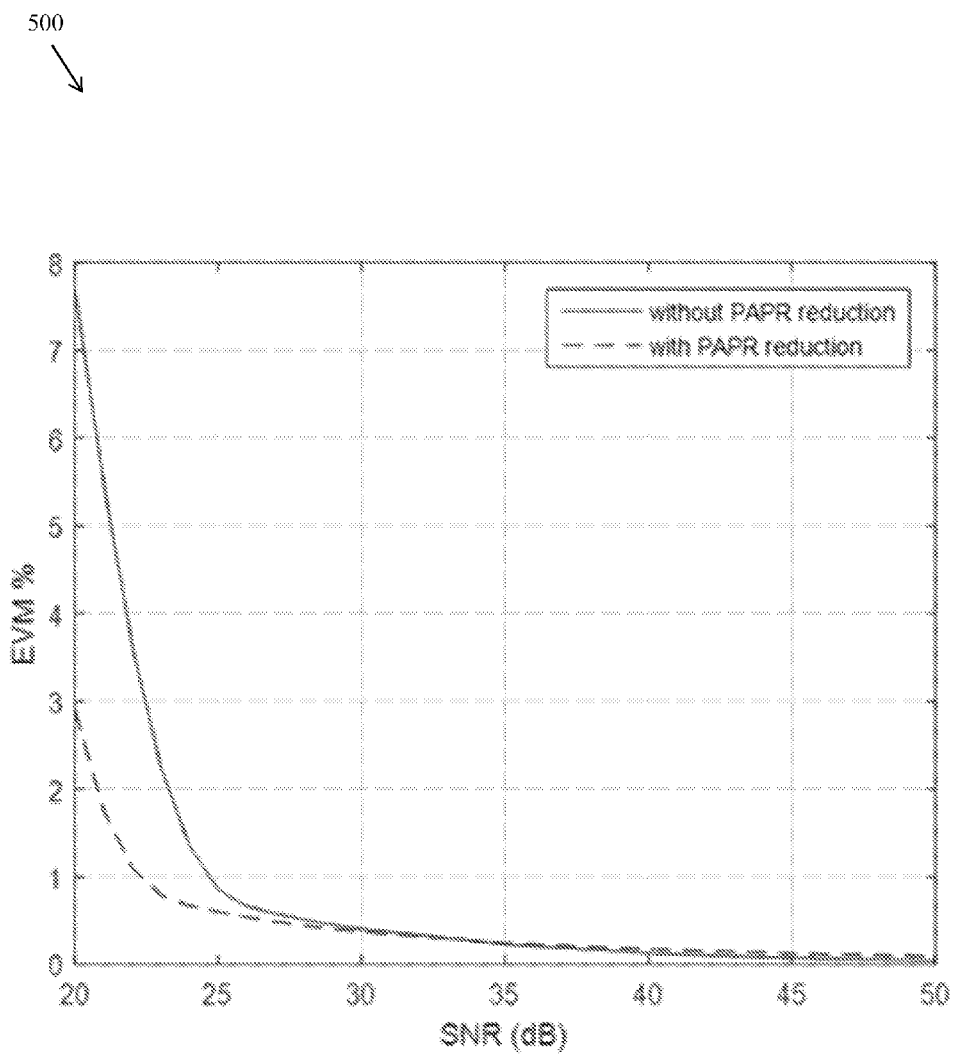
FIG. 5 is a graph of simulated EVM versus SNR measured at the receiver in FIG. 3.

FIG. 5 is a graph 500 of simulated EVM versus SNR measured at the receiver 300 in FIG. 3. The x-axis represents SNR in dB, and the y-axis represents EVM in percentage (%). The graph 500 comprises two curves, a first solid curve representing EVM without PAPR reduction and a second dashed curve representing EVM with PAPR reduction. As shown, the PAPR reduction shown in the graph 400 translates to an improved EVM. Specifically, from an SNR of about 20 dB to an SNR of about 28 dB, PAPR reduction provides an EVM reduction of about 0.1% to about 5%. In addition, at a 1% EVM, PAPR reduction provides an SNR improvement of about 2.5 dB.

Figure 6:
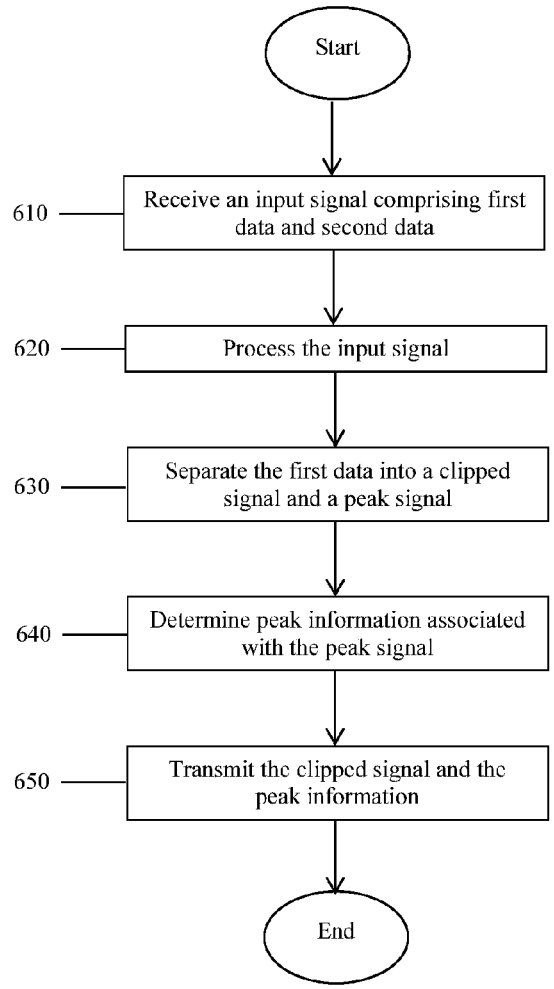
FIG. 6 is a flowchart illustrating a method of PAPR reduction according to an embodiment of the disclosure.

FIG. 6 is a flowchart illustrating a method 600 of PAPR reduction according to an embodiment of the disclosure. The transmitter 200 may implement the method 600. At step 610, an input signal comprising first data and second data is received. For instance, the separators 220 receive input signals 1-m. At step 620, the input signal is processed. The input signal can be processed to separate the first data from the second data, where the first data comprises IQ data and the second data comprises code words (CWs). At step 630, the first data are separated into a clipped signal and a peak signal. For instance, the PAPR reducer 260 processes the PCM IQ data and separates the PCM IQ data into the clipped signal c(n) and the peak signal p(n). At step 640, peak information associated with the peak signal is determined. In some examples, the PAPR reducer 260 determines the index n or both the index n and the quantization level k(n). Finally, at step 650, the clipped signal and the peak information are transmitted. For instance, the transmitter 200 transmits the aggregated signal to the receiver 300. However, it should be understood that the transmitter 200 can transmit the aggregated signal to one or more other devices, systems, or networks.

Figure 7:
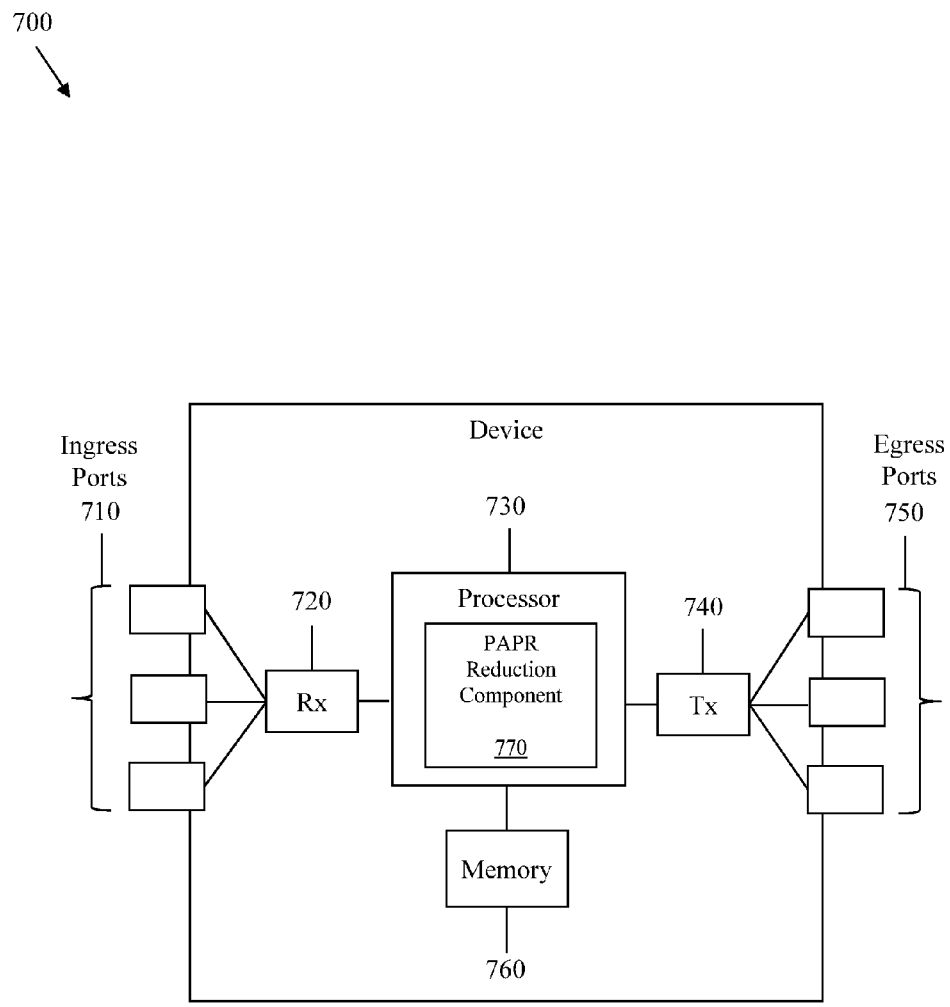
FIG. 7 is a schematic diagram of a device according to an embodiment of the disclosure.

FIG. 7 is a schematic diagram of a device 700 according to an embodiment of the disclosure. The device 700 is suitable for implementing the disclosed embodiments, for instance the transmitter 200 and/or the receiver 300. The device 700 comprises ingress ports 710 and receiver units (Rx) 720 for receiving data; a processor, logic unit, or central processing unit (CPU) 730 to process the data; transmitter units (Tx) 740 and egress ports 750 for transmitting the data; and a memory 760 for storing the data. The device 700 may also comprise optical-to-electrical (OE) components and electrical-to-optical (EO) components coupled to the ingress ports 710, the receiver units 720, the transmitter units 740, and the egress ports 750 for ingress or egress of optical or electrical signals.

The processor 730 is implemented by any suitable combination of hardware, middleware, firmware, and software. The processor 730 may be implemented as one or more CPU chips, cores (e.g., as a multi-core processor), field-programmable gate arrays (FPGAs), application specific integrated circuits (ASICs), or digital signal processors. The processor 730 is in communication with the ingress ports 710, receiver units 720, transmitter units 740, egress ports 750, and memory 760. The processor 730 comprises a PAPR reduction component 770. The PAPR reduction component 770 implements the disclosed embodiments, for instance the PAPR reducer 260 and the peak recoverer 340. The inclusion of the PAPR reduction component 770 therefore provides a substantial improvement to the functionality of the device 700 and effects a transformation of the device 700 to a different state. Alternatively, the PAPR reduction component 770 is implemented as instructions stored in the memory 760 and executed by the processor 730. The processor 730, the memory 760, or both may store the method 600 so that the device 700 may implement the method 600.

The memory 760 comprises one or more disks, tape drives, or solid-state drives and may be used as an over-flow data storage device, to store programs when such programs are selected for execution, or to store instructions and data that are read during program execution. The memory 760 may be volatile and/or non-volatile and may be read-only memory (ROM), random-access memory (RAM), ternary content-addressable memory (TCAM), or static random-access memory (SRAM).

In an example embodiment, an apparatus comprises: a receiver element configured to receive an input signal comprising IQ data and CWs; a PAPR reducer element coupled to the receiver port and configured to: receive the IQ data, process the IQ data, separate the IQ data into a clipped signal and a peak signal, and determine peak information associated with the peak signal; and a transmitter element coupled to the PAPR reducer and configured to separately transmit the clipped signal and the peak information.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The termed "coupled" and its derivatives includes both directly coupled and indirectly coupled. The use of the term "about" means a range including ±10% of the subsequent number, unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a receiver port configured to receive an input signal comprising in-phase and quadrature (IQ) data and control words (CWs);
   a peak-to-average power (PAPR) reducer coupled to the receiver port and configured to:
      receive the IQ data,
      process the IQ data,
      separate the IQ data into a clipped signal and a peak signal, and
      determine peak information associated with the peak signal; and
   a transmitter port coupled to the PAPR reducer and configured to separately transmit the clipped signal and the peak information.

2. The apparatus of claim 1, wherein the transmitter port is further configured to not transmit the peak signal.

3. The apparatus of claim 1, wherein the transmitter port is further configured to:
   transmit the clipped signal using an IQ channel; and
   transmit the peak information using a CW channel.

4. The apparatus of claim 3, wherein the IQ channel is not substantially error-free and the CW channel is substantially error-free.

5. The apparatus of claim 1, wherein the PAPR reducer is further configured to further process the input signal according to the following algorithm:

if $s(n) > V_{max}$, $k(n) = \text{ceiling}[(s(n) - V_{max})/\Delta]$ $p(n) = k(n) * \Delta$ $c(n) = s(n) - p(n)$;

else if $s(n) < -V_{max}$, $k(n) = \text{floor}[(s(n)+V\max)/\Delta]$ $p(n) = k(n)*\Delta$ $c(n) = s(n) - p(n);$ else, $p(n) = 0$ $c(n) = s(n),$ wherein s(n) is the input signal, n is a time index or a frequency index, $V_{max}$ is a clipping threshold, k(n) is a quantization level, $\Delta$ is a quantization step, p(n) is the peak signal, and c(n) is the clipped signal, and wherein the transmitter port is further configured to transmit n and k(n) using a CW channel.

6. The apparatus of claim 1, wherein the PAPR reducer is further configured to further process the input signal according to the following algorithm:

if $s(n) > V_{max}$, $p(n) = S_{max} - V_{max}$ $c(n) = s(n) - p(n);$ else if $s(n) < -V_{max}$, $p(n) = S_{max} - V_{max}$ $c(n) = s(n) + p(n);$ else, $p(n) = 0$ $c(n) = s(n),$ wherein s(n) is the input signal, n is a time index or a frequency index, $V_{max}$ is a clipping threshold, p(n) is the peak signal, $S_{max}$ is a maximum amplitude of the input signal, and c(n) is the clipped signal, and wherein the transmitter port is further configured to transmit n using a CW channel.

7. The apparatus of claim 1, wherein the PAPR reducer is further configured to further process the input signal according to the following algorithm:

if $|s(n)| > V\max$, $\alpha = V_{max}/S_{max},$ $c(n) = \alpha * s(n);$ else $c(n) = s(n),$ wherein s(n) is the input signal, n is a time index or a frequency index, $\alpha$ is a constant, $V_{max}$ is a clipping threshold, $S_{max}$ is a maximum amplitude of the input signal, and c(n) is the clipped signal, and wherein the transmitter port is further configured to transmit n using a CW channel.

8. The apparatus of claim 1, wherein the PAPR reducer is further configured to further process the input signal according to the following algorithm:

if $s(n) > V_{max}$, $c(n) = 2*V_{max} - s(n);$ else if $s(n) < -V_{max}$, $c(n) = -2*V_{max} - s(n);$ else $c(n) = s(n),$ wherein s(n) is the input signal, n is a time index or a frequency index, $V_{max}$ is a clipping threshold, and c(n) is the clipped signal, and wherein the transmitter port is further configured to transmit n using a CW channel.

9. The apparatus of claim 1, wherein the PAPR reducer is further configured to separate the IQ data into the clipped signal and the peak signal based on a clipping threshold that is 0.5 times to 0.8 times a maximum amplitude of the IQ data.

10. A method comprising:
receiving an input signal comprising first data and second data;
processing the first data;
separating the first data into a clipped signal and a peak signal;
determining peak information associated with the peak signal; and
transmitting the clipped signal and the peak information.

11. The method of claim 10, wherein the first data are in-phase and quadrature (IQ) data and the second data are control words (CWs).

12. The method of claim 10, further comprising further transmitting the clipped signal using an IQ channel and the peak information using a CW channel.

13. The method of claim 12, wherein the IQ channel is not substantially error-free and the CW channel is substantially error-free.

14. The method of claim 10, wherein the peak information comprises an index for each non-zero value of the peak signal, wherein the index represents time.

15. The method of claim 14, wherein the peak information further comprises a quantization level for each non-zero value of the peak signal.

16. The method of claim 10, further comprising separating the first data into the clipped signal and the peak signal based on a clipping threshold that is 0.5 times to 0.8 times a maximum amplitude of the first data.

17. An apparatus comprising:
a receiver port configured to:
receive a cupped signal using a first channel, and
receive peak information using a second channel, wherein the peak information is associated with a peak signal; and
a peak recoverer coupled to the receiver port and configured to recover the peak signal based on the clipped signal and the peak information.

18. The apparatus of claim 17, wherein the peak recoverer is further configured to combine the clipped signal and the peak signal to form an input signal.

19. The apparatus of claim 17, wherein the peak information consists of an index for each non-zero value of the peak signal.

20. The apparatus of claim 17, wherein the peak information consists of an index and a quantization level for each non-zero value of the peak signal.

* * * * *

UNITED STATES PATENT AND TRADEMARK OFFICE
CERTIFICATE OF CORRECTION

| | | |
|---|---|---|
| PATENT NO. | : 9,641,373 B2 | Page 1 of 1 |
| APPLICATION NO. | : 15/182362 | |
| DATED | : May 2, 2017 | |
| INVENTOR(S) | : Huaiyu Zeng et al. | |

It is certified that error appears in the above-identified patent and that said Letters Patent is hereby corrected as shown below:

In the Claims

Column 14, Lines 43-51, Claim 17 should read:
17. An apparatus comprising:
 a receiver port configured to:
 receive a clipped signal using a first channel, and
 receive peak information using a second channel, wherein the peak information is associated with a peak signal; and
 a peak recoverer coupled to the receiver port and configured to recover the peak signal based on the clipped signal and the peak information.

Signed and Sealed this
First Day of August, 2017

Joseph Matal
*Performing the Functions and Duties of the*
*Under Secretary of Commerce for Intellectual Property and*
*Director of the United States Patent and Trademark Office*